W. D. LEMONS.
COMBINED SEED PLANTER AND FERTILIZER DISTRIBUTER.
APPLICATION FILED MAR. 29, 1911.
1,004,797.
Patented Oct. 3, 1911.
4 SHEETS—SHEET 1.
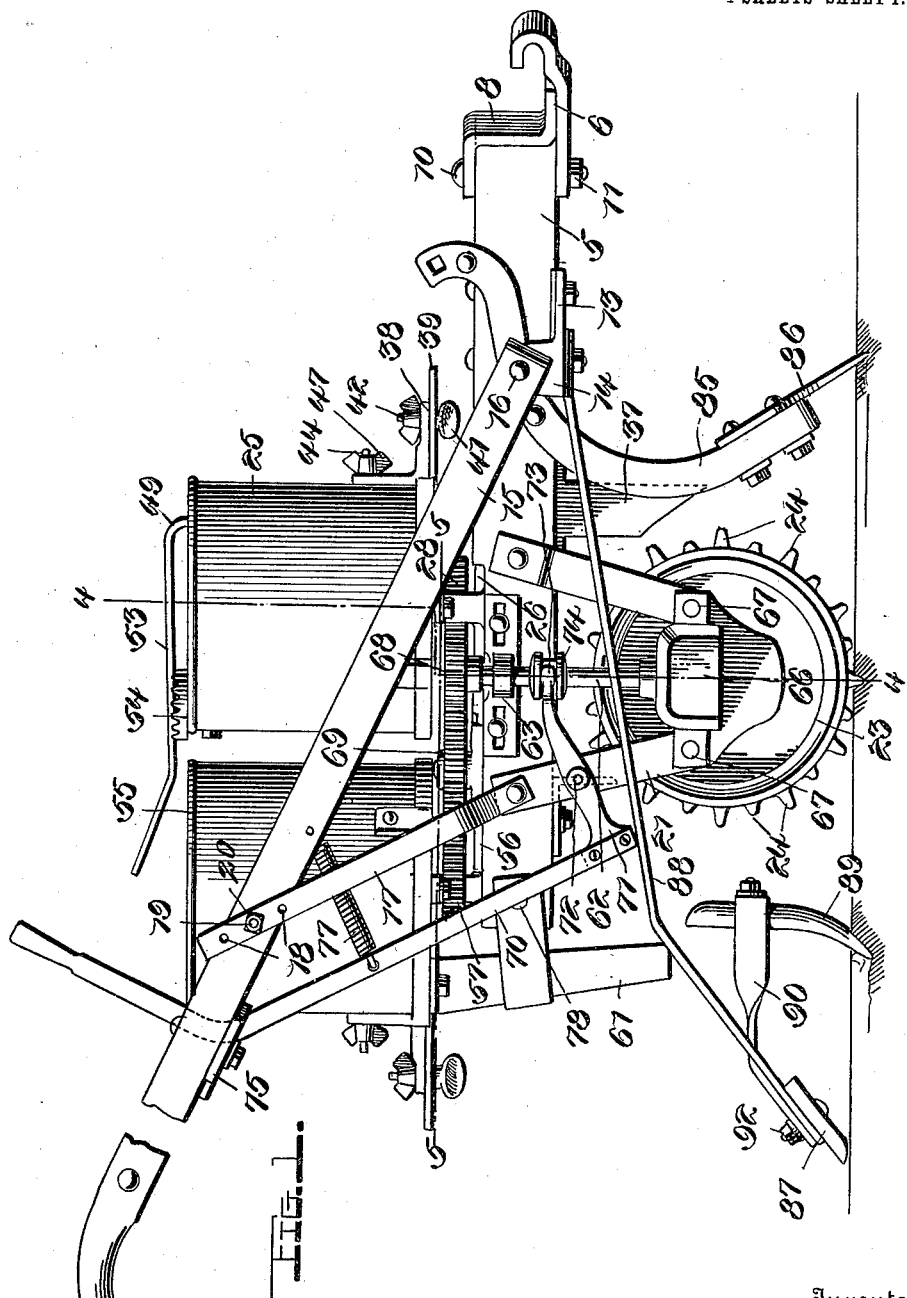
Witnesses
Inventor
William D. Lemons.
By Watson E. Coleman,
Attorney

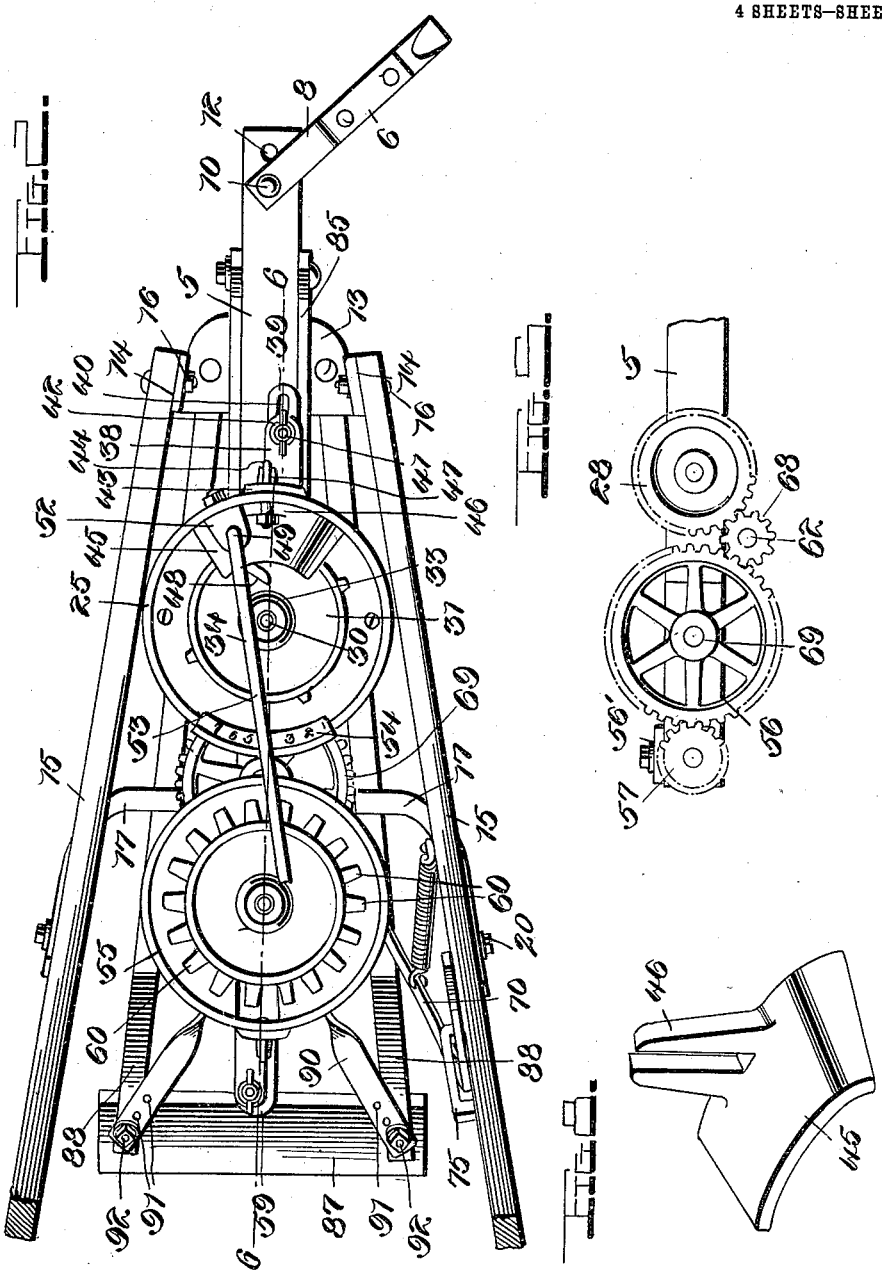

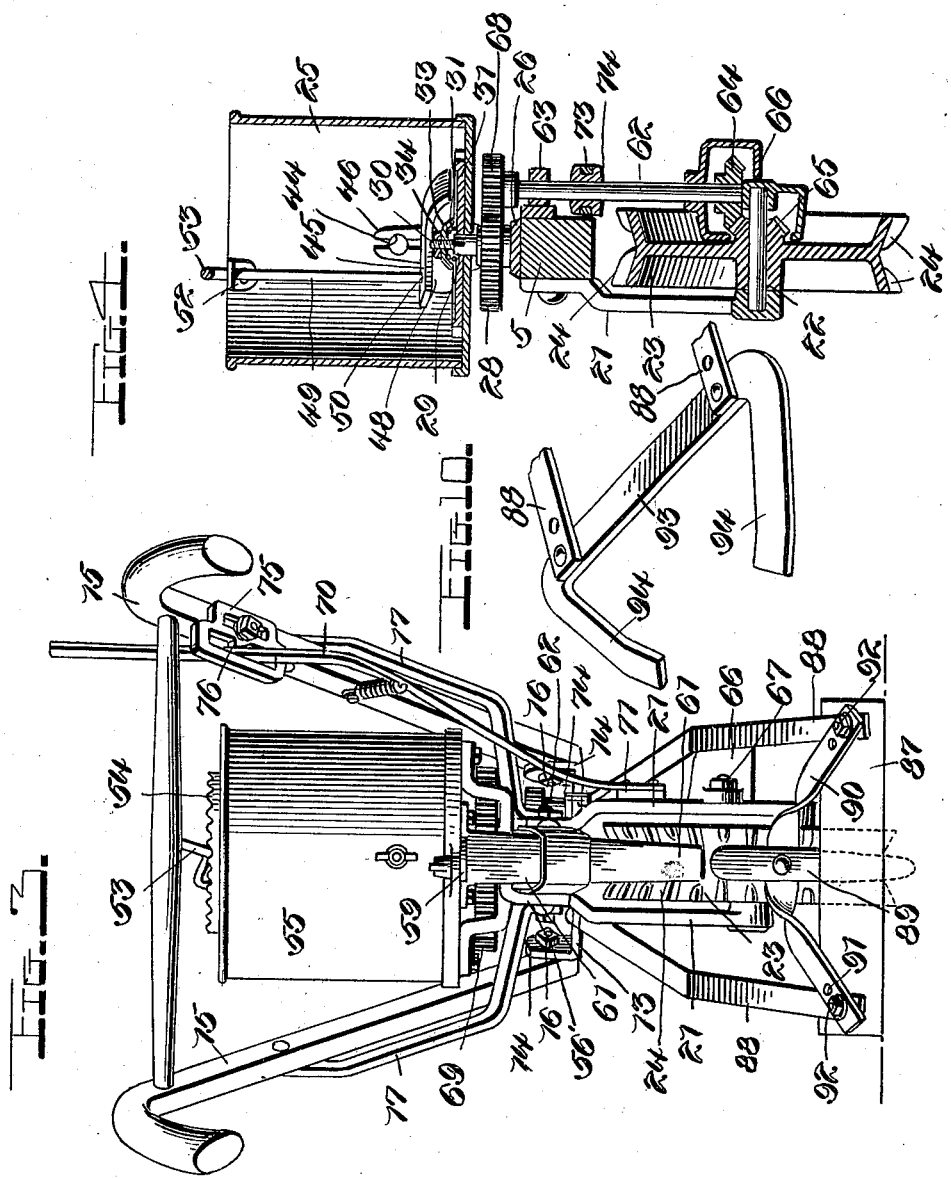

W. D. LEMONS.
COMBINED SEED PLANTER AND FERTILIZER DISTRIBUTER.
APPLICATION FILED MAR. 29, 1911.
1,004,797.
Patented Oct. 3, 1911.
4 SHEETS—SHEET 4.
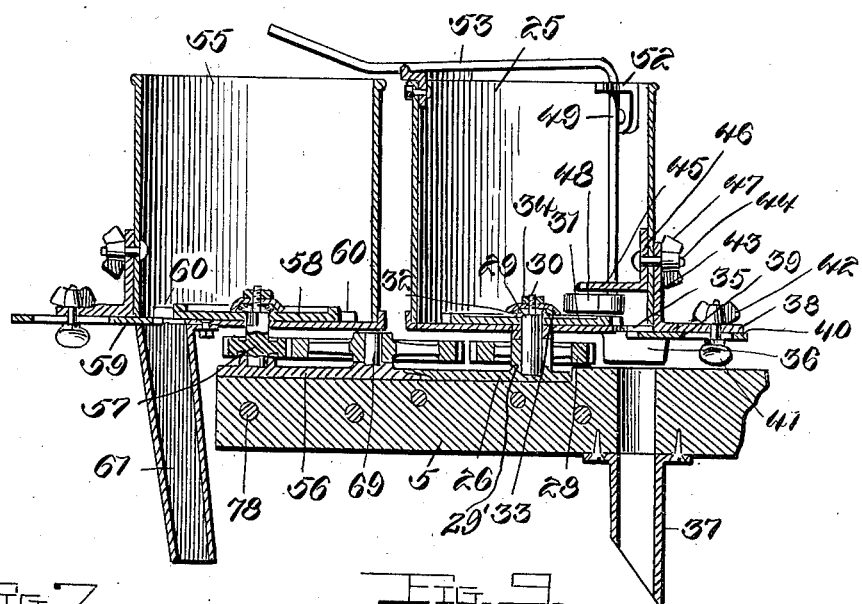
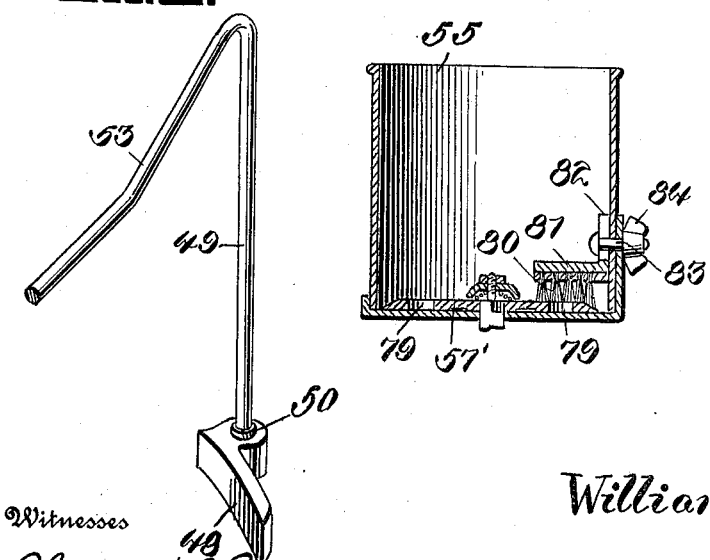
Inventor
William D. Lemons.
Witnesses
Charles L. Griestauer.
L. S. Ellis.
By Watson E. Coleman.
Attorney.

UNITED STATES PATENT OFFICE.

WILLIAM D. LEMONS, OF SHELBY, NORTH CAROLINA, ASSIGNOR OF ONE-HALF TO WILLIAM D. BABINGTON AND THOMAS J. BABINGTON, OF SHELBY, NORTH CAROLINA.

COMBINED SEED-PLANTER AND FERTILIZER-DISTRIBUTER.

1,004,797.

Specification of Letters Patent.

Patented Oct. 3, 1911.

Application filed March 29, 1911. Serial No. 617,618.

*To all whom it may concern:*

Be it known that I, WILLIAM D. LEMONS, a citizen of the United States, residing at Shelby, in the county of Cleveland and State of North Carolina, have invented certain new and useful Improvements in Combined Seed-Planters and Fertilizer-Distributers, of which the following is a specification, reference being had to the accompanying drawings.

This invention relates to improvements in combined seed planters and fertilizer distributers of that character shown and described in Patent #971,856 granted to me October 4th, 1910, the present invention having for its primary object to materially simplify and increase the durability and efficiency of the various features of construction disclosed in the aforementioned patent.

A further object of the invention is to improve the means for regulating the feed of the fertilizing material.

Still another object of the invention is to improve the operating mechanism for rotating the seed and fertilizer feed plates, and means whereby such mechanism is thrown into or out of operation.

With the above and other objects in view, the invention consists of the novel features of construction, combination and arrangement of parts hereinafter fully described and claimed, and illustrated in the accompanying drawings, in which—

Figure 1 is a side elevation of a combined seed planter and fertilizer distributer embodying my improvements; Fig. 2 is a top plan view; Fig. 3 is a rear end elevation; Fig. 4 is a transverse section taken on the line 4—4 of Fig. 1; Fig. 5 is a section taken on the line 5—5 of Fig. 1; Fig. 6 is an enlarged section through the seed fertilizer hoppers and the beam upon which they are mounted taken on line 6—6 of Fig. 2; Fig. 7 is a detail perspective view of the deflecting plate and adjusting rod removed from the fertilizer hopper; Fig. 8 is a similar view of the shield or guard plate; Fig. 9 is a detail section through the seed hopper, similar to Fig. 6 showing the arrangement of parts for the dropping of corn or other seed in hills; Fig. 10 is a detail perspective view of a slightly modified form of the covering plate.

Referring more particularly to the drawings 5 designates a beam upon the forward end of which a clevis bar 6 is arranged. Suitable draft attachments are adapted to be connected to said clevis bar.

To the under side of the beam 5 adjacent to its forward end, a plate 13 is bolted and extends upon opposite sides thereof and is provided with the upstanding ears 14 to which the forward ends of the rearwardly extending handles 15 are secured by means of suitable fastening bolts 16. The handle bars 15 are adjustably supported on the upper ends of the bars 17 which at their lower ends are secured to opposite sides of the beam 5, the upper ends of said supporting bars being provided with a plurality of openings 18 to receive a bolt 19 disposed through the handle bars and having a nut 20 threaded upon its end. Thus it will be obvious that the handles may be readily raised or lowered by loosening the forward bolt 16 and removing the bolt 19 and positioning the same through any one of the openings in the upper ends of the supporting bars 17. To opposite sides of the beam 5 adjacent to its rear end the depending hangers 21 are secured, in the lower ends of which the wheel axle or shaft 22 is mounted. Upon this shaft a ground wheel 23 is fixed. The periphery of said wheel is preferably V-shaped in cross section and has formed thereon the staggered ribs or flanges 24 which are adapted to engage the earth and thoroughly disturb and mix the same with the fertilizer material which is deposited in advance of the ground wheel in the manner which will be more fully set forth in the following description.

Upon the beam 5 the fertilizer hopper 25 is mounted. This hopper is secured upon the ends of a base plate 26 which is arranged upon the beam. This base plate has a bearing 29' formed thereon to receive a journal formed on a gear 28. The bottom of the hopper is centrally provided with an opening through which a rectangular boss 29 formed on the upper face of the gear extends. A cylindrical screw threaded shank 30 extends centrally from the rectangular boss. A feed plate 31 has a central rectangular opening to receive the boss 29 on the gear, and a coiled spring 32 is then disposed upon the threaded shank 30 and rests at its lower end upon the feed plate. A cap 33 is now placed upon the upper end of the spring, said cap being provided with an opening to receive the shank 30. The pressure of the spring on the feed plate is regulated by adjusting a nut 34 upon the threaded shank to force the cap 32 downwardly upon the spring. The feed plate 31 may be of any desired form, and is adapted to feed the material to an opening 35 provided in the bottom of the hopper 25 at one side thereof. The bottom of the hopper is formed with the depending flanges 36 upon opposite side of this opening, and a depositing chute or spout 37 is fixed at its upper end in an opening in the beam immediately below the lower edges of said flanges. This depositing spout has its lower end disposed adjacent to the ground wheel 23. The bottom of the feed hopper is also provided with a laterally extending arm 38 upon the under side of which a slide plate 39 is mounted. This plate is provided with a longitudinal slot 40 to receive a bolt 41 in the arm 38 and upon the upper end of this bolt a wing nut 42 is threaded whereby said plate may be rigidly fixed in its adjusted position. This plate extends between the flanges 36 on the bottom of the hopper and beneath the opening 35 through which the fertilizing material is directed into the spout 37. By properly adjusting this slide plate, it will be obvious that a greater or less amount of material may be caused to fall into the spout. The bottom of the hopper also has a vertical plate 43 formed thereon at the inner end of the arm 38, and a bolt 44 is disposed through the upper end of this plate and the body of the hopper. A shield or cut-off plate 45 is arranged within the hopper 25 and is of arcuate form, one end of said plate being bent or curved and disposed adjacent to the surface of the feed plate 31. This shield has formed upon one of its edges a bifurcated vertical arm 46 to receive the bolt 44. A wing nut 47 is threaded on the outer end of this bolt whereby the shield plate may be raised or lowered and rigidly fixed in its adjusted position with relation to the surface of the feed plate 31. In order to regulate the quantity of material which moves beneath the shield plate and through the opening 35 in the bottom of the hopper, I provide a deflecting plate 48 fixed to the lower end of a vertically disposed adjusting rod 49 which is loosely disposed through an opening 50 in the shield plate 45. The upper end of the rod 49 is mounted in a bearing plate 52, and is bent at right angles and horizontally disposed across the top of the hopper as indicated at 53. This horizontally disposed portion of the adjusting rod is adapted to be grasped and positioned by the operator between the teeth of a rack 54 which is fixed to the upper edge of the hopper. On reference to Fig. 2 it will be readily noted that by adjusting this rod, the deflecting plate 48 may be disposed at any angle with relation to the inner edge of the shield plate 45 so as to cause the desired quantity of material to move between the under surface of the shield plate and the feed plate 31 and thus be directed through the opening 35 in the bottom of the hopper and into the depositing spout 37.

Upon the rear end of the beam 5 the seed hopper 55 is mounted upon a transverse bearing plate 56. Upon this bearing plate a pinion 57 is mounted. This pinion is similar in form to the gear 28 and is provided with similar means for the attachment of a feed plate 58. The construction of the seed hopper is substantially similar in all respects to the fertilizer hopper and is also provided with a feed regulating slide plate 59. The feed plate 58 is provided upon its periphery with a plurality of directing lugs or fingers 60 which direct the seed to the discharge opening in the bottom of the hopper as the plate rotates. A discharging spout 61 is secured to the rear end of the beam beneath the discharge opening in the seed hopper.

Rotary movement is transmitted to the fertilizer and seed feeding plates which are arranged in the hoppers through the medium of a vertically disposed shaft 62 mounted in a bearing 63 arranged upon one side of the beam 5. A beveled gear 64 is secured to the lower end of said shaft and meshes with a similar gear 65 fixed upon the ground wheel shaft 22. To the lower end of the hangers 21, the gear case 66 is secured. This case is formed in two sections bolted to opposite sides of the hangers by means of suitable bolts 67. This case affords the necessary protection for the gears so that the earth which is thrown up by the ground wheel will not accumulate thereon and interfere with their proper operation. A pinion 68 is also secured to the upper end of the vertical shaft 62 and meshes with the teeth of the gear 28 which is arranged beneath the fertilizer hopper. This pinion also engages the teeth of a transmission gear 69 which is mounted upon the beam 5 and engages the teeth of the pinion 57 which is arranged beneath the seed hopper. In this manner it will be seen that the feed plates 31 and 58 which are arranged in the hoppers are simultaneously rotated to feed the fertilizer material and the seed to the depositing spouts. The gear 28 is considerably larger than the pinion 57 so that a sufficient quantity of the fertilizer is deposited, which is thoroughly mixed with the earth by means of the flanged driving wheel before the seed are deposited in the same.

The operation of the depositing mechanisms may be started or interrupted at the will of the operator by means of a lever 70 the lower end of which is fixed to a bar 71 pivoted as at 72 upon one of the hangers 21. A yoke 73 is formed on the bar 71 to engage a collar 74 fixed upon the vertically disposed power transmission shaft 62. The upper end of this lever is arranged in a guide bracket 75 which is secured to one of the handle bars. This bracket is provided with a lug 76 for engagement by the lever 70. A spring 77 has one of its ends connected to said lever and is secured at its other end to the handle. The force exerted by this spring normally holds the parts in their operative positions, the beveled gears on the wheel shaft 22 and the transmission shaft 62 being engaged. When it is desired to discontinue the operation of the planting mechanisms, the operator grasps the upper end of the lever 70 and moves the same rearwardly into engagement with the lug 76 of the guide member 75 through which said lever is disposed. In this movement of the lever 70, the bar 71 is oscillated upon its pivot and the power transmission shaft 62 elevated in its bearing to disengage the gear carried thereby from the gear on the wheel shaft. The transverse plate 56 upon which the seed hopper 55 is mounted has a plate 56' formed thereon which engages upon one side of the beam 5. Through this plate a fastening bolt 78 is disposed. This bolt also secures the seed depositing spout to the rear end of the beam. It will thus be obvious that by simply removing the bolt 78, the seed hopper and the depositing spout may be removed from the beam and the machine used solely as a fertilizer distributer.

In Fig. 9 of the drawings there is illustrated a slightly different form of the feed plate 57' which is arranged in the seed hopper and is particularly adapted for the feeding of corn or other seed in hills. This plate is provided adjacent to its edge with a series of openings 79 which are adapted to pass over the discharge or outlet opening in the bottom of the hopper to permit the kernels of grain or seed to drop into the spout 61. When this plate 57' is used, I also arrange in the hopper 55 a brush 80 which is secured to an attaching plate 81. This plate has a bifurcated arm 82 to receive a bolt 83 disposed through the wall of the seed hopper. A wing nut 84 is threaded upon the outer end of the bolt and is adapted to bind against the bifurcated arm to rigidly secure the brush in its adjusted position. The bristles of the brush bear upon the feed plate in line with the openings 79 therein and is disposed above the outlet or discharge opening in the bottom of the hopper. Thus as the feed plate rotates in the hopper the corn or other grain seed is intermittently deposited into the chute or spout 61.

To the forward end of the beam 5 a depending standard or foot 85 is secured. Upon this foot a furrow opening shovel 86 is adjustably mounted and opens a furrow in the earth into which the fertilizing material is deposited, the spout 37 being located immediately in the rear of said shovel. A covering plate 87 is located in the rear of the ground wheel 23 and is secured to the rear ends of the spring bars 88, the forward ends of which are secured to the transverse plate 13 carried by the beam 5. This covering plate or scraper is transversely disposed and inclined downwardly and rearwardly, its lower edge being beveled whereby the earth is evenly distributed over the seed which are deposited in a furrow formed by an adjustable shovel 89 secured to the intermediate portion of a substantially V-shaped bar 90. The ends of this bar are each provided with a plurality of openings 91 to receive the fastening bolts 92 which secure the covering plate to the ends of the spring bars 88. Thus the shovel may be adjusted on the covering plate to regulate the depth of the furrow. The lower end of the seed depositing spout 61 is disposed immediately in the rear of the shovel and is adapted to deposit the seed in the furrow left thereby. The covering plate then covers the seed with the earth which has been thrown from the furrow.

In Fig. 10 I have shown a slightly modified form of the covering plate which consists of the transversely disposed plate 93, the ends of which are downwardly and inwardly inclined as indicated at 94. This covering plate is adapted to be arranged upon the ends of the spring bars 88 and it will be readily seen that in the movement of the machine, the earth which is thrown from the furrow by the shovel 89 is directed inwardly over the seed which are deposited in the furrow by the inwardly inclined ends 94 of said plate. This modified form of the covering plate is especially adapted for use in the planting of corn so as to insure the covering of the same.

From the foregoing it is believed that the construction and operation of my improved machine will be apparent. By eliminating the transmission chain for the operation of the depositing mechanism as disclosed in my former patent, the efficiency and durability of the machine as a whole is materially increased as it was found that clods of earth would be caught in the chain and either break the same or seriously interfere with the proper operation of the mechanism. The construction embodied in the present application is therefore more durable, inexpensive and efficient than that set forth in my prior patent.

While I have particularly shown and described the preferred construction and arrangement of the various parts, it will be understood that the same may be variously modified without departing from the spirit or sacrificing any of the advantages of the invention.

Having thus described the invention what is claimed is:—

1. In a machine of the character described, the combination of a beam, hangers secured to the beam, a ground wheel mounted in the hangers, fertilizer and seed hoppers supported upon said beam, rotary fertilizer and seed dropping plates in the respective hoppers, mechanism for operating said plates including a vertically disposed power transmission shaft, intermeshing gears on said transmission shaft and the ground wheel shaft, and means for vertically moving the transmission shaft to disengage said gears and simultaneously discontinue the rotary movement of the fertilizer and seed dropping plates.

2. In a machine of the character described, the combination of a beam, a ground wheel supporting said beam, fertilizer and seed hoppers mounted upon the beam, rotary fertilizer and seed dropping plates arranged in the respective hoppers, a vertically slidable power transmission shaft geared at its lower end to the ground wheel shaft, a pinion on the upper end of said shaft, gearing mounted on the beam between said pinion and the fertilizer and seed dropping plates to transmit rotary movement to the latter, a pivotally mounted bar engaged at one end with said vertical shaft, a hand lever connected at the other end of said bar, a guide for said lever, a spring yieldingly holding said lever against movement when said vertical shaft and the ground wheel shaft are in gear, the movement of said lever being adapted to elevate the shaft and disengage the pinion on the upper end thereof from the transmission gearing between the same and the dropping plates to simultaneously discontinue the rotary movement of said plates, said guide for the lever having means to lock the lever against movement and maintain said vertical shaft in its inoperative position.

3. In a machine of the character described, the combination of a beam, hangers secured to opposite sides of the beam, a shaft journaled in the lower end of said hangers, a ground wheel fixed on said shaft, fertilizer and seed hoppers mounted upon the beam each having a discharge opening in its bottom, feeding mechanism in each of said hoppers geared to the ground wheel shaft, depositing spouts arranged upon the beam beneath the discharge openings, a furrow opening shovel secured to the beam adjacent to the fertilizer depositing spout, a yieldingly supported covering plate disposed rearwardly of the beam, and a shovel adjustably mounted upon said plate and disposed between the ground wheel and the seed depositing spout to open a furrow to receive the seed.

4. In a machine of the character described, the combination of a beam, a ground wheel supporting said beam, fertilizer and seed hoppers mounted on the beam each having a discharge opening in its bottom, feeding mechanism arranged in each of said hoppers and geared to the shaft of the ground wheel for simultaneous operation, fertilizer and seed depositing spouts arranged on the beam in the front and rear respectively of the ground wheel, a shovel mounted on the beam in front of the ground wheel to open a furrow to receive the fertilizer, a yieldingly mounted covering plate disposed rearwardly of the seed depositing spout, a forwardly extending V-shaped bar adjustably secured upon said plate, and a shovel adjustably mounted upon the intermediate portion of said bar and located between the ground wheel and the seed depositing spout to open a furrow to receive the seed.

5. In a machine of the character described, the combination of a beam, a ground wheel supporting said beam, fertilizer and seed hoppers mounted on the beam and each having a discharge opening in its bottom, dropping mechanism arranged in each of said hoppers and geared to the shaft of the ground wheel for simultaneous operation, fertilizer and seed depositing spouts arranged on the beam in the front and rear respectively of the ground wheel, a transversely disposed yieldingly mounted covering plate arranged in the rear of the seed depositing spouts, a furrow opening shovel mounted upon said plate, and means for adjusting said shovel with relation to the seed depositing spout.

6. In a machine of the character described, the combination of a beam, a ground wheel supporting said beam, fertilizer and seed hoppers mounted on the beam each having a discharge opening in its bottom, dropping mechanism arranged in each of said hoppers and geared to the shaft of the ground wheel for simultaneous operation, fertilizer and seed depositing spouts arranged on the beam in the front and rear respectively of the ground wheel, spring bars rigidly mounted upon the beam adjacent its forward end and extending downwardly and rearwardly thereof, a transverse covering plate secured to the rear ends of said bars, a forwardly extending bar adjustably mounted upon said plate, a furrow opening shovel vertically adjustable upon said bar, and means for rigidly securing said bar in its adjusted position upon the covering plate to dispose said shovel with relation to the plate and the seed depositing spout.

In testimony whereof I hereunto affix my signature in the presence of two witnesses.

WILLIAM D. LEMONS.

Witnesses:
FORREST ESKRIDGE,
ROY R. SISK.

Copies of this patent may be obtained for five cents each, by addressing the "Commissioner of Patents, Washington, D. C."